United States Patent [19]

Hitchcock

[11] 3,978,444
[45] Aug. 31, 1976

[54] SEAFLOOR MAPPING SYSTEM

[75] Inventor: Robert D. Hitchcock, Ventura, Calif.

[73] Assignee: The United States of America as represented by the Secretary of the Navy, Washington, D.C.

[22] Filed: May 30, 1975

[21] Appl. No.: 582,481

[52] U.S. Cl. .............................. 340/3 F; 343/5 PC; 343/7.9
[51] Int. Cl.² ....................... G01S 9/66; G01S 7/60
[58] Field of Search .......... 340/3 R, 3 F; 343/5 PC, 343/5 CM, 7.9

[56] References Cited
UNITED STATES PATENTS 3,191,170 6/1965 Lustig et al. ...................... 340/3 F
3,840,844 10/1974 Hitchcock ......................... 340/3 R Primary Examiner—Richard A. Farley
Attorney, Agent, or Firm—Richard S. Sciascia; Joseph M. St. Amand; Darrell E. Hollis

[57] ABSTRACT

A seafloor mapping system utilizing echo signals from a pair of towed, side-looking sonar transducers to generate in real time a roll of photographic film which after conventional processing can be directly viewed in a stereoscope to produce a three-dimensional illusion of seafloor topography.

12 Claims, 4 Drawing Figures

SEAFLOOR MAPPING SYSTEM

BACKGROUND OF THE INVENTION

1. Field of the Invention

The present invention relates generally to seafloor mapping systems and more particularly to such systems generating a stereo-film of the seafloor topography.

2. Description of the Prior Art

Various methods of seafloor mapping have been tried in recent years. Included in stereo-photo mapping of the seafloor by direct photography of the seafloor. Such systems exhibit limited effectiveness as they have a relative short underwater light sensing range.

U.S. Pat. No. 3,840,844 to the Applicant of the present application describes an electron beam analog technique for determining the X-Y-Z coordinates, in real time, of a seafloor target using two independently measured sonar-echo ranges as obtained by a pair of rotating, pulsed, side-looking sonar transducers, displaced from each other along a common vertical axis. The basic concept of this analog technique is utilization of the intersection of two circles, representing the respective wave fronts of the acoustic energy radiating cylindrically from the two sonar transducers. The intersection point is found in real time by means of a rastered electron beam; and the X-Y coordinates of the point are translated electronically to a PPI readout. The system of U.S. Pat. No. 3,840,844, however, is limited to determination of the coordinates of a single seafloor point in each aximuth sector of the scanned area.

SUMMARY OF THE INVENTION

The present invention provides a stereo-film of the coordinates of the seafloor being mapped from echo ranges produced by a pair of towed, pulsed, side-looking sonar transducers. A pair of circular arcs of light are imaged onto a photoconductive, liquid-crystal, layered array which irradiates a point of light at the intersection point of the two arcs of light. The radius of each circular arc of light is proportional to its respective echo range. The point of light is imaged onto a photographic film through a staircased fiber-optic system, a stereo lens pair and a fiber-optic light funnel to yield the stereo film.

DETAILED DESCRIPTION OF THE PREFERRED EMBODIMENT

Figure 1:
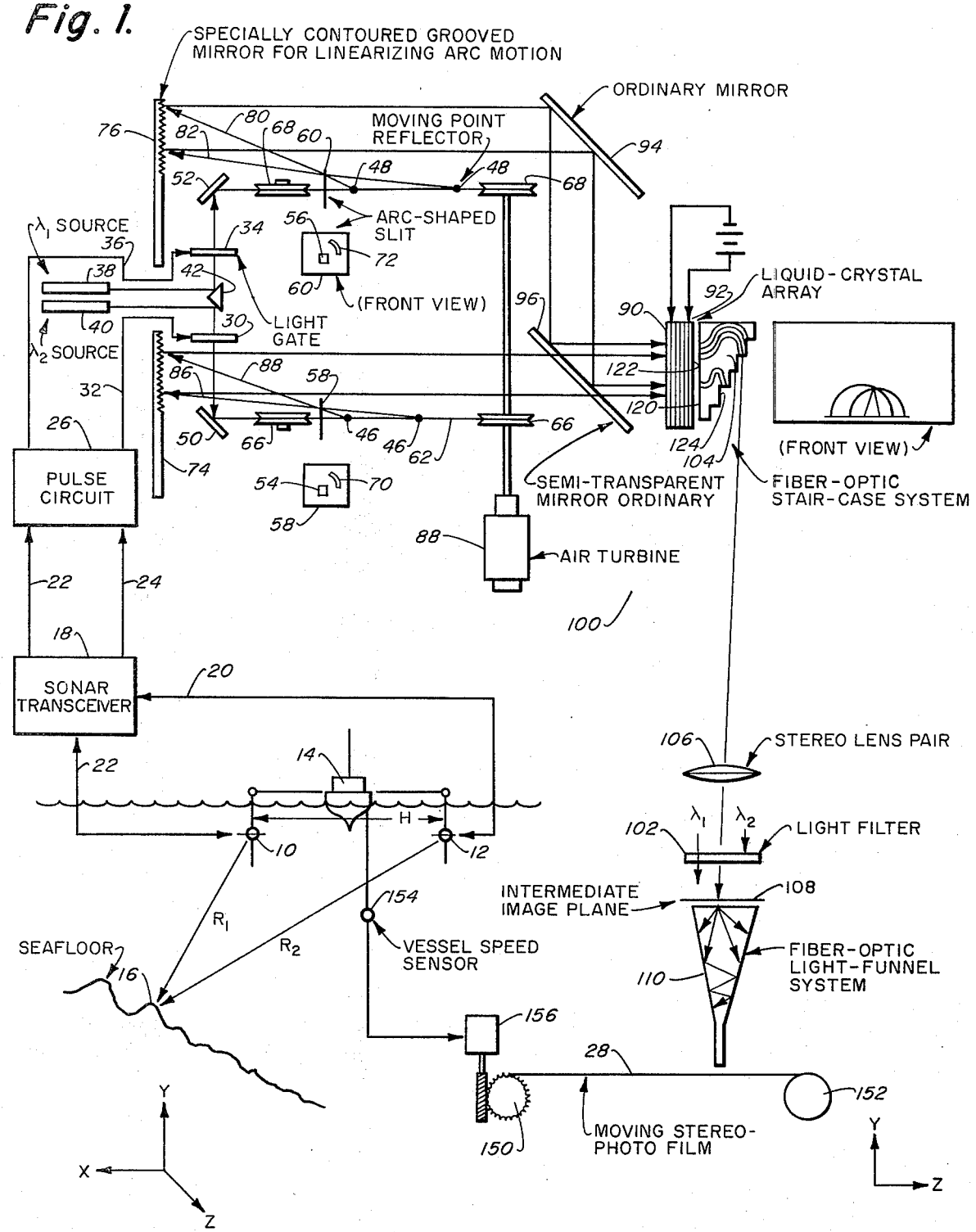
FIG. 1 illustrates the major components of one embodiment of the present invention.

Turning to FIG. 1, a pair of towed, pulsed, side-looking sonar transducers 10 and 12 are shown towed in a horizontal plane (X-Z) by ship 14. Transducers 10 and 12 are separated by a horizontal distance H. The vector distance $R_1$ between transducer 10 and the seafloor being mapped 16 comprises echo range $R_1$. The vector distance $R_2$ between transducer 12 and the seafloor being mapped 16 comprises echo range $R_2$.

The operation begins with the towed pair of side-scan sonar transducers 10 and 12 radiating sonar pulses equally spaced in time. Sonar transceiver 18 is adjusted to generate, from each transducer, a pulse every $T_j$ second, where $$T_j = 2 R_{j\ max}/C \qquad (1)$$

$$j = 1, 2, 3$$

$R_{j\ max}$ = maximum sonar range
$C$ = velocity of sound in seawater $\simeq$ 5000 ft/sec For the towed pair of transducers 10 and 12, $R_{2\ max}$ could be set equal to 200 feet; and, with a transducer separation H of 40 feet, $R_{1\ max}$ is set equal to 160 feet. Each transducer is pulsed simultaneously so that the outgoing pulse wavefront from transducer 10 would be ahead of the outgoing pulse wavefront from transducer 12 by 40 feet. The sonar frequencies and pulse widths are such that each transducer receives only the echo signal from its own transmitted pulse. For example, with transducer 10's frequency and pulse width set at typical values of 50 KHz and 0.1 ms, respectively, and transducer 12's frequency and pulse width set at 105 KHz and 0.1 ms, respectively, conventional filter circuitry could be used to provide the required pulse discrimination.

With the above adjustments, $T_1$ and $T_2$ are both set equal to 80 ms, and the echo signal to transducer 10 would return, at most, 16 ms ahead of the return to transducer 12.

The wavefronts from transducers 10 and 12 are confined to a sonar beam angle, $\theta$, which is identical for each transducer. The return signal intensity to each transducer is a train of rectangular pulses of differing widths and spacing, depending on the seafloor X-Y profile at a given Z position. Ship 14 moves in an X-Z plane along the Z axis. The Z coordinate may be considered a constant since in 80 ms, a towed transducer moving at a typical speed of 2 knots would move only 0.27 feet, which is better than the system resolution of approximately 0.5 feet.

Transducers 10 and 12 are connected to sonar transceiver 18 by lines 20 and 22, respectively.

Pulse circuit 26 is connected to sonar transceiver 18 via lines 22 and 24. Pulse circuit 26 is responsive only to negative time derivatives in the echo-signal train. Such circuitry is within the state-of-the-art and can consist basically of a transformer having a diode in its secondary circuit. Hence, a rectangular signal on the transformer primary would, with a suitably connected diode in the secondary, produce a short output pulse in the secondary circuit only at the end or turn-off of the input. Therefore, this feature allows only the beginning of shadow regions in the return signal to appear on stereo photo film 28. Pulse circuit 26 is connected to light gate 30 via line 32 and light gate 34 via line 36.

A light source 38 radiates light having a wavelength $\lambda_1$, which bounces off reflector 42 impinging upon light gate 34. A light source 40 radiates light having a wavelength $\lambda_2$, which bounces off reflector 42 impinging upon light gate 30. Light gates 30 and 34 are designed to either block completely the light from light source 38 and 40, respectively, or allow maximum light passage therethrough.

Light passing through light gates 30 and 34 is directed onto moving reflectors 46 and 48, respectively, by reflectors 50 and 52, respectively, through apertures 54 and 56 of light barriers 58 and 60. Moving reflectors 46 and 48 are disposed on continuous wires 62 and 64, respectively. Wires 62 and 64 ride on pulleys 66 and 68, respectively, such that light reflected from moving reflectors 46 and 48 through arc-shaped apertures 70 and 72, respectively, images on grooved mirrors 74 and 76, respectively.

As moving reflectors 46 and 48 move in a straight line toward light barriers 58 and 60, progressively larger circular arcs of light image on grooved mirrors 74 and 76, respectively. Lines 80 and 82 denote this effect for moving reflector 48 while lines 84 and 86 denote the effect for moving reflector 46. Of course, only one moving reflector 46 and 48 will reflect light through arc-shaped apertures 70 and 72 at any one instant. Two moving reflectors 46 and two moving reflectors 48 are shown in FIG. 1 to illustrate the progressively larger circular arcs of light generated as moving reflectors 46 and 48 move toward light barriers 58 and 60 in a straight line. Air turbine motor 88 drives pulleys 66 and 68 at speeds fast enough that the projection of arc-shaped apertures 70 and 72 on grooved mirrors 74 and 76, respectively, will vary from minimum to maximum size in the time period $T_j$ between transmitted pulses from transducers 10 and 12. Typically, this time period is on the order of 80 milliseconds.

The rate of increase in the radius of each projected circular arc is substantially constant since each acoustic wavefront moves at a constant velocity in the seawater. Grooved mirrors 74 and 76 perform the function of linearizing the rate of increase of each projected circular arc radius. Grooved mirrors 74 and 76 are designed such that the radius of the circular arcs of light imaged thereon are maintained in constant proportion to the range of the seafloor being mapped which generated the sonar return signal. Grooved mirrors 74 and 76 have progressively increasing concentric circular arc-shaped grooves thereon with all circular arc-shaped grooves having a common center. Each groove is a narrow spherical shell oriented so as to image the arc-shaped aperture projection concentrically onto photoconductive layer 90 of liquid-crystal array 92. The number of concentric grooves on the face of grooved mirrors 74 and 76 depend on the resolution of the mapping system, e.g., for a 0.5 ft resolution, and 200 ft maximum range, there would be 400 concentric grooves.

Mirror 94 directs light from grooved mirror 76 onto semi-transparent mirror 96. Light from mirror 96 is reflected onto photoconductive layer 90. Light from grooved mirror 74 passes through mirror 96 impinging on photoconductive layer 90.

Liquid-crystal array 92 consists of six layers as shown in FIG. 1.

A relatively small DC voltage ($\simeq 10V$) is applied to the transparent electrodes. The resistivity of photoconductor layer 90 is such that, in darkness, most of the voltage is across photoconductor layer 90, leaving the liquid crystal in the nematic phases. In the nematic phase, the liquid crystal is transparent; and therefore, if light incident on the photoconductor 90 is absorbed in photoconductor 90, photoconductor 90's resistivity is lowered and a part of the DC voltage is applied to the nematic layer. This causes dynamic scattering in liquid-crystal array 92, which, for certain viewing angles, makes the regions receiving light appear bright (light scattering is predominantly forward).

The principles described above are used in this invention to irradiate a luminous point at the intersection of two circular arcs projected onto photoconductive layer 90. Light gate 34 controlled by transducer 10 opens only when the received echo signal turns off. Light, of wavelength $\lambda_1$ from light source 38, reaches photoconductive layer 90 in the shape of a circular arc, which as explained previously has a radius at this instant proportional to the distance vector between transducer 10 and the apex of a seafloor outcropping at point 16. The magnitude of $\lambda_1$ is such that photoconductor 90 absorbs the $\lambda_1$ light along the path of the circular-arc image and, hence, produces dynamic scattering along this path inside liquid-crystal array 92. A bias DC voltage across the liquid-crystal array 92 is set just below threshold so that the time for the array 92 to go from nematic to dynamic scattering is less than 0.1 ms (corresponding to 0.5 ft. sonar resolution). Decay of dynamic scattering, on the other hand, is tens of milliseconds.

Zinc sulfide provides a suitable photoconductor and, for this material, light of wavelength $\lambda_1$ from light source 38 is in the ultraviolet region of the spectrum. The light of wavelength $\lambda_2$ from light source 40 for imaging the circular arc controlled by transducer 12 is in the visible region of the spectrum and hence is not absorbed by the zinc sulfide photoconductor layer 90. The $\lambda_2$ light will be imaged along the circular arc having its radius proportional to the distance vector between transducer 12 and the echo point. However, only at the intersection point of the two arcs will light be scattered by the liquid crystal array 92. Thus, the light from the intersection point only will be directed onto fiber-optic imaging system 100, and from there onto the left and right sides of the stereo-photo film 28. To ensure that $\lambda_1$ light does not affect the film (assuming scattering of $\lambda_1$ light by the liquid crystal), ultraviolet-absorbing filter 102 is placed ahead of film 28.

Figure 2:
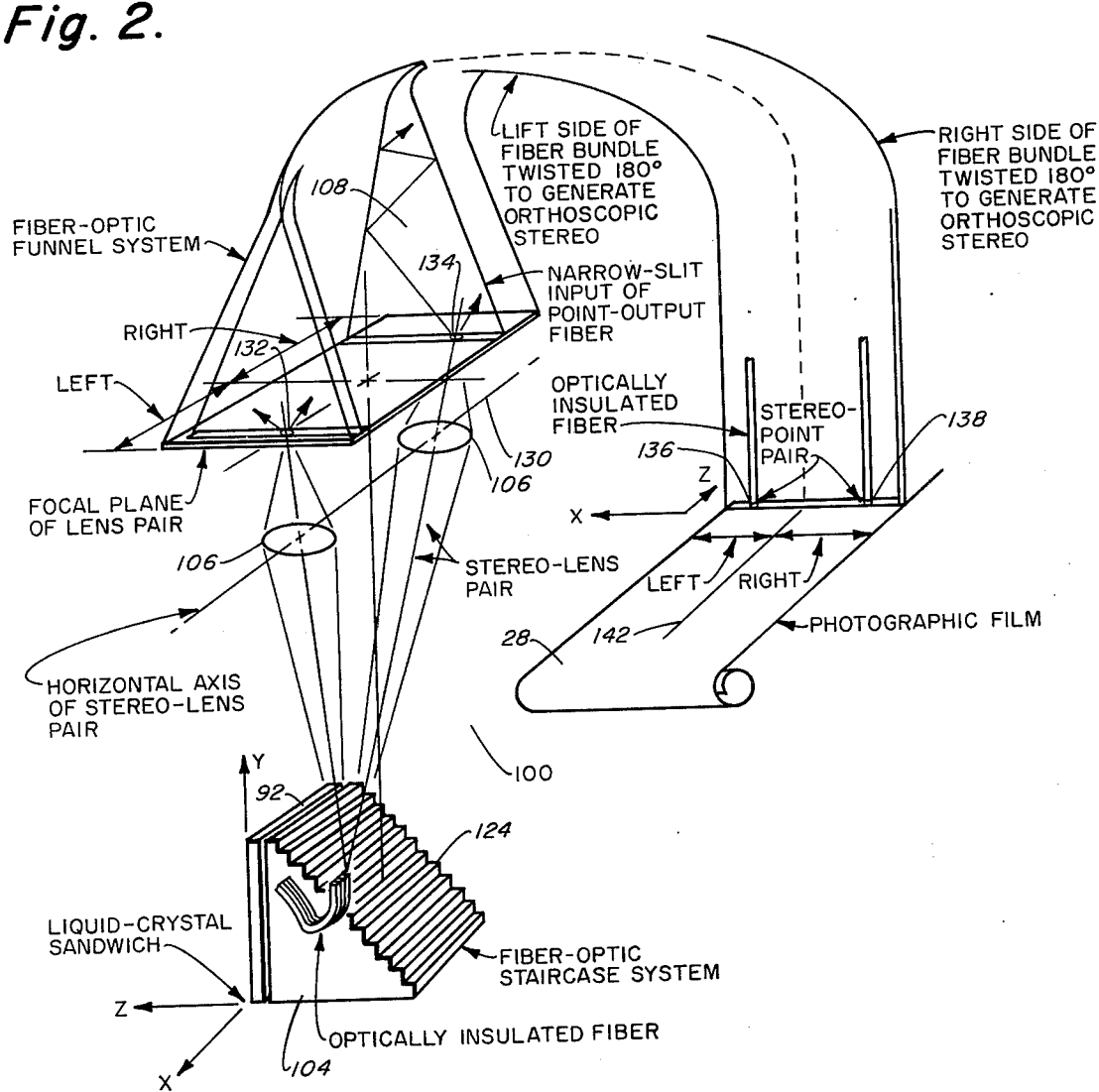
FIG. 2 illustrates the fiber-optic stereo lens system of FIG. 1 in greater detail.
Figure 3:
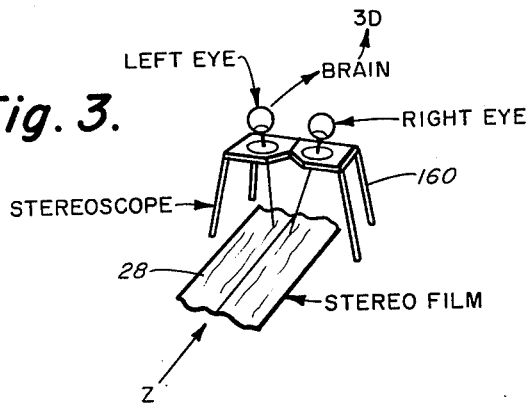
FIG. 3 illustrates a stereoscope utilized to view the exposed film.

Detailed operation of fiber-optic imaging system 100 is illustrated schematically in FIG. 2. The basic function of system 100 is the translation of seafloor points in the X-Y plane to corresponding stereo point-pairs lying on a straight line in the X-Z plane as the plane of film 28.

Fiber-optic imaging system 100 consists of staircased fiber-optic system 104, stereo-lens pair 106, light filter 102, intermediate image plane 108, and fiber-optic light funnel system 110.

Planar surface 120 of staircased fiber-optic system 104 is disposed adjacent planar surface 122 of liquid-crystal array 92. Planar surface 122 irradiates a point source of light corresponding to the point of intersection of the two circular arcs of light impinging upon photoconductive layer 90. It is noted that the two circular arcs of light impinging upon layer 90 have centers separated by a distance functionally related to the separation distance H between transducers 10 and 12. Also, the centers of the two circular arcs of light define a line common to diameters of both circular arcs of light.

Light entering the fiber-optic bundles along planar surface 120 exits staircased fiber-optic system 104 along staircased surface 124. Each resolution element of liquid-crystal array 92 is imaged onto a point lying in staircased surface 124. The face of each step is parallel to intermediate stereo image plane 108 which corresponds to the focal plane of stereo-lens pair 106.

Image points on staircased surface arc 124 imaged onto intermediate stereo-image plane by means of stereo-lens pair 106. In general, these stereo-image points will be off horizontal axis 130 of stereo-lens pair 106. Fiber-optic light funnel 108 projects these points onto a straight line. As shown in FIG. 2, light from staircased surface 124 passes through stereo lens pair 106 impinging upon funnel 108 at point 132 and 134. The light from points 132 and 134 is funneled down to exit points 136 and 138 corresponding to a pair of optic fiber bundles disposed with other bundles from funnel 108 in a straight line adjacent film 28.

Funnel 108 has center line 140 corresponding to centerline 142 lying along the longitudinal axis of film 28. Thus, all light entering funnel 108 to the left of centerline 140 will be imaged on the left of centerline 142 on film 28 and visa versa.

It is noted that the point of light irradiated by liquid-crystal array 92 lies in the X-Y plane while film 28 lies in the X-Z plane. Film 28 moves on rollers 150 and 152 with the velocity of movement being functionally related to the velocity of ship 14 with respect to the seafloor. The perpendicular distance from centerline 142 on film 28 to either point 136 or 138 is functionally related to the vertical distance between the horizontal plane in which transducers 10 and 12 lie and the point 16, the seafloor being mapped. Speed sensor 154 is connected to film drive motor 156, thus supplying the necessary sensing function.

Simultaneously with the initiation of each sonar pulse (every $T_j$ second), the previously-generated dynamic-scattering regions of the liquid crystal are erased by application of a suitable AC pulse.

It is noted that the progressively increasing circular arcs of light may be generated by a high-speed movie projector technique, using a film containing a large number of frames (say 400) each with a picture of a successively larger circular arc. Projection would utilize a rotating mirror. Also, the use of a fluidic high speed zoom lens is possible. Also, the linearization of the projected circular light arcs can be generated by means of an image-distorting lens system which causes the lateral magnification to be a function of the off-axis position of the object.

In summary the mapping system of FIG. 1 operates as follows. Upon the transmission of pulses from transducers 10 and 12, reflectors 46 and 48 begin to move in a straight line toward light barriers 54 and 56. When transducer 10 receives a return echo signal pulse, circuit 26 is actuated, thereby opening light gate 34 for a predetermined amount of time. This results in a circular arc of light being imaged upon photoconductive layer 90 by grooved mirror 76. Thereafter, when transducer 12 receives a return echo signal pulse, circuit 26 is actuated, thereby opening light gate 30 for a predetermined amount of time. This results in a circular arc of light being imaged upon photoconductive layer 90 by grooved mirror 74. Of course, the maximum time elapsing between the impingement of the two circular arcs of light upon photoconductive layer 90 is sufficiently long for liquid-crystal array 92 to irradiate a point of light on surface 122 corresponding to the intersection of the two circular arcs of light on photoconductive layer 90. Fiber-optic system 100 images this point of light on film 28 in stereo. Liquid-crystal array 92 is cleared and the process repeats itself with the velocity of the film being functionally related to the velocity of transducers 10 and 12.

Figure 4:
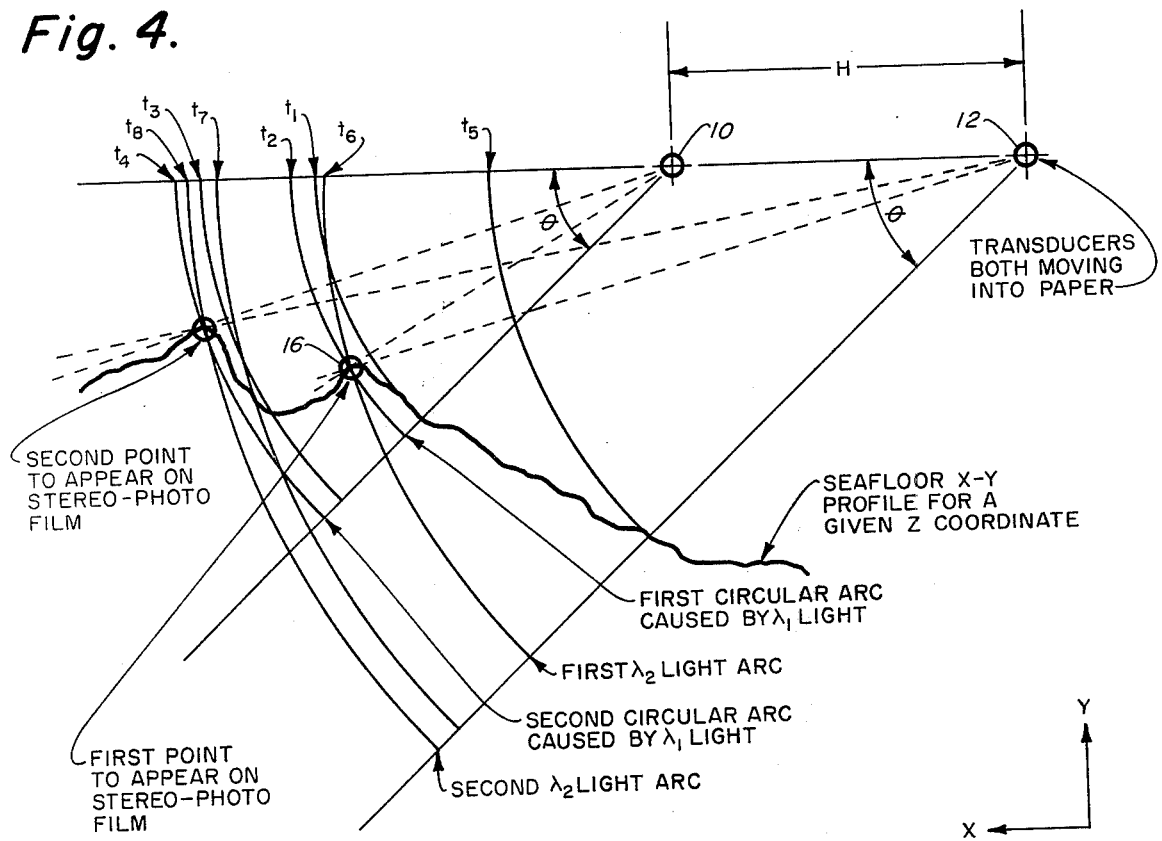
FIG. 4 illustrates an example of time sequence for the embodiment of FIGS. 1 and 2.
Figure 4:
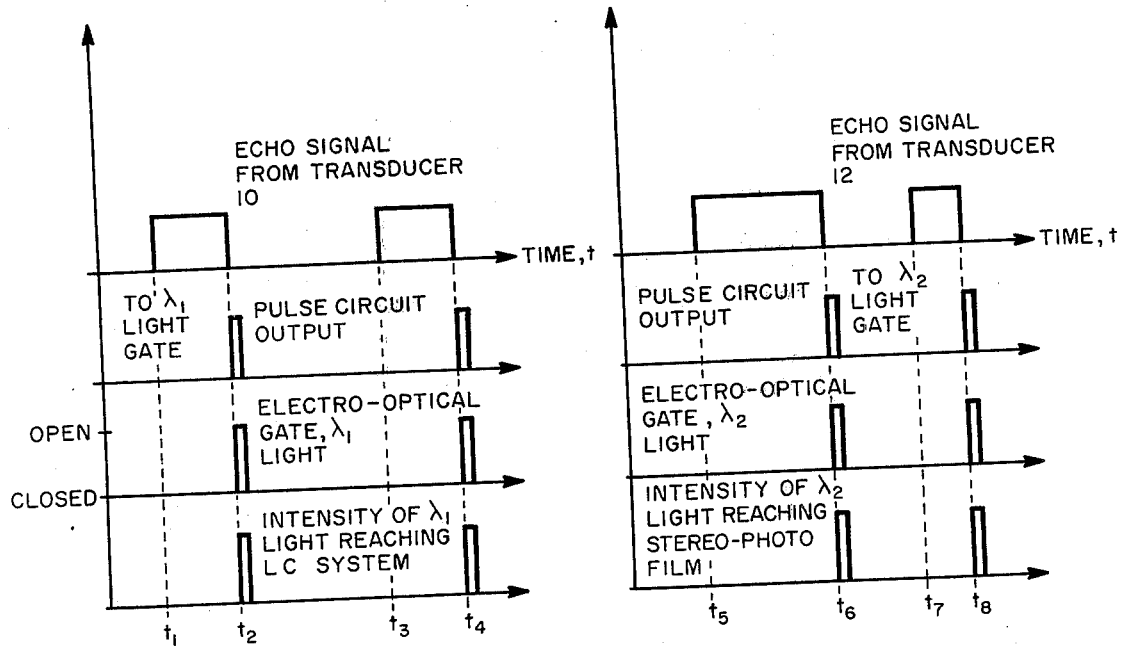

FIG. 4 illustrates an example time sequence for the embodiment of FIG. 1 and FIG. 2. The angle $\theta$ is the sonar beam elevation angle. At time $t_1$, the acoustic wavefront from transducer 10 returns to transducer 10, thereby initiating the echo signal transmitted to pulse circuit 26 via line 22. At time $t_2$, the echo signal ends triggering a pulse on line 36, opening light gate 34 for a predetermined amount of time. In like manner $t_5$ and $t_6$ illustrate the operation of light gate 30 for the first point to appear on stereo-photo film 28. Also, times $t_3$, $t_4$, $t_7$, and $t_8$ illustrate the operation of light gates 30 and 34 for the second point to appear on stereo-photo 28.

It is noted that it takes the acoustic wavefronts from transducers 10 and 12 an equal amount of time to traverse the distance from transducer 10 or 12 to point 16 as to traverse the distance from point 16 to transducer 10 or 12. It is therefore understood that either the speed of moving reflectors 46 and 48 or the perpendicular distance between centerline 142 and point 136 or 138 compensate for this doubling of the time factors.

Of course, obvious light blocking materials will be disposed to form various light barriers in the embodiment of FIGS. 1 and 2 so as to eliminate interference from undesirable light sources as would be necessary and sufficient for proper operation of the embodiment. Such materials are not shown in FIGS. 1 and 2.

Obviously, numerous modifications and variations of the present invention are possible in light of the above teachings. It is therefore to be understood that within the scope of the appended claims the invention may be practiced otherwise than as specifically described herein.

I claim:

1. A seafloor mapping system for providing a stereo-film of the coordinates of the seafloor being mapped from first and second echo ranges produced by respective first and second rotating, pulsed, side-looking sonar transducers comprising:
    a. means for creating a point of light with respect to first and second center reference points on said means such that first and second vectors are formed therebetween, said first and second vectors being functionally related to said first and second echo ranges, respectively;
    b. said stereo-film having a centerline along its longitudinal axis; and
    c. means for guiding said point of light onto said stereo-film exposing said film at a point on either side of said centerline, the perpendicular distance from each said exposure point to said centerline being proportional to the vertical distance from said first and second transducer to the seafloor surface being mapped.

2. The apparatus of claim 1 wherein the transducers have a first velocity with respect to the seafloor surface being mapped, said stereo-film having a second velocity functionally related to said first velocity.

3. The apparatus of claim 1 wherein said point-of-light creating means includes:
    a. means communicating with the first and second transducers for respectively producing first and second circular arcs of light having respective first and second radii functionally related to said first and second echo ranges, respectively, said first and second circular arcs of light having respective first and second centers defining a line common to diameters of both circular arcs of light, said centers being separated by a first distance, said first distance being functionally related to the separation distance between said first and second transducer; and b. means for receiving said first and second circular arcs of light and irradiating light at the point of intersection therebetween, said first and second radii taken from said first and second centers to said point of intersection being proportional to said first and second echo ranges, respectively.

4. The apparatus of claim 3 wherein said circular arcs of light producing means includes
 a. first and second light sources emanating light of first and second wavelengths, respectively;
 b. first and second means for producing respective first and second circular arcs of light whenever light from said first and second light sources impinges thereupon;
 c. first and second light gates for passing light from said first and second light sources, respectively, to said first and second circular arcs of light producing means, respectively, for a predetermined amount of time whenever said first and second transducers respectively receive first and second echo return signals;
 d. means for guiding said first and second circular arcs of light to impinge upon said irradiating light means such that said first and second centers define a line common to diameters of both circular arcs of light, said centers being separated by said first distance.

5. The apparatus of claim 4 wherein said first and second means for producing first and second circular arcs of light includes:
 a. a first and second light impeding barrier having an arc-shaped aperture therein;
 b. a first and second moving diffuse reflector connected to receive light from said first and second light gates, respectively, each said reflector moving in a straight line toward one said light barrier such that light reflected from said reflector passes through said arc-shaped aperture.

6. The apparatus of claim 4 wherein said circular arc of light guiding means includes:
 first and second means for linearizing said first and second circular arcs of light, respectively.

7. The apparatus of claim 6 wherein said first and second linearizing means includes a first and second mirror having a plurality of circular arc-shaped grooves thereon, said circular arc-shaped grooves having radii with common centers.

8. The apparatus of claim 3 wherein said means for irradiating light includes a light-crystal array.

9. The apparatus of claim 1 wherein said point of light-guiding means includes:
 a. a staircased optical fiber system connected to receive light from said point of light;
 b. a fiber-optic light funnel connected to receive light from said staircased fiber-optical system, light exiting said funnel impinging upon said stereo-film; and
 c. a stereo-lens pair disposed between said staircased fiber-optical system and said funnel.

10. The apparatus of claim 9 further including a light filter for passing light the frequency of said second light source while blocking light the frequency of said first light source.

11. A method for providing a stereo-film of the coordinates of the seafloor being mapped from first and second echo ranges produced by respective first and second rotating, pulsed, side-looking sonar transducers comprising:
 a. creating a point of light with respect to first and second center reference points such that first and second vectors are formed therebetween, said first and second vectors being functionally related to said first and second echo ranges, respectively; and
 b. guiding said point of light onto said stereo-film exposing said film at a point on either side of its centerline, the perpendicular distance from each said exposure point to said centerline being proportional to the vertical distance from said first and second transducer to the seafloor surface being mapped.

12. The method of claim 11 wherein said step of creating a point of light includes the steps of:
 a. producing first and second circular arcs of light having respective first and second radii functionally related to said first and second echo ranges, respectively, said first and second circular arcs of light having respective first and second centers defining a line common to diameters of both circular arcs of light, said centers being separated by a first distance, said first distance being functionally related to the separation distance between said first and second transducer; and
 b. irradiating light at the point of intersection between said first and second circular arcs of light, said first and second radii taken from said first and second centers to said point of intersection being proportional to said first and second echo ranges, respectively.

* * * * *